United States Patent
Beer et al.

(10) Patent No.: US 6,840,387 B2
(45) Date of Patent: Jan. 11, 2005

(54) MULTILAYER COMPOSITE FILTER MEDIUM FOR SERIAL FILTRATION

(75) Inventors: Markus Beer, Morsbach (DE); Marco Rosendahl, Morsbach (DE); Wolfgang Stausberg, Morsbach (DE)

(73) Assignee: IBS Filtran Kunststoff-/Metallerzeugnisse GmbH, Morsbach (DE)

( * ) Notice: Subject to any disclaimer, the term of this patent is extended or adjusted under 35 U.S.C. 154(b) by 0 days.

(21) Appl. No.: 10/087,953

(22) Filed: Mar. 5, 2002

(65) Prior Publication Data

US 2003/0106295 A1 Jun. 12, 2003

(30) Foreign Application Priority Data

Dec. 8, 2001 (EP) ............................................. 01129171

(51) Int. Cl.⁷ ................................................. B01D 46/00
(52) U.S. Cl. .......................... 210/490; 55/487; 156/290
(58) Field of Search ................................ 55/385.3, 486, 55/487, 490, 491, 521, 524, DIG. 5, DIG. 45; 210/488–492; 156/73.1, 73.4, 290, 580.1, 580.2, 581

(56) References Cited

U.S. PATENT DOCUMENTS

| | | | | |
|---|---|---|---|---|
| 4,702,940 A | * | 10/1987 | Nakayama et al. | 427/244 |
| 5,215,609 A | * | 6/1993 | Sanders | 156/70 |
| 5,630,940 A | * | 5/1997 | Van Rossen et al. | 210/484 |
| 5,647,881 A | * | 7/1997 | Zhang et al. | 55/382 |
| 5,656,368 A | * | 8/1997 | Braun et al. | 428/141 |
| 5,701,893 A | | 12/1997 | Kern et al. | 128/206.24 |
| 5,770,077 A | | 6/1998 | Goldman | 210/490 |
| 6,056,809 A | * | 5/2000 | Chapman | 96/67 |
| 6,123,752 A | * | 9/2000 | Wu et al. | 96/69 |
| 6,193,773 B1 | | 2/2001 | Schlör et al. | 55/382 |
| 6,451,205 B1 | * | 9/2002 | McGaw, Jr. | 210/168 |
| 6,524,360 B2 | * | 2/2003 | Cox et al. | 55/382 |

\* cited by examiner

*Primary Examiner*—Frank M. Lawrence
(74) *Attorney, Agent, or Firm*—Baker & Hostetler LLP

(57) ABSTRACT

A multilayer composite filter medium for serial filtration with an onflow side and an outflow side with respect to a medium to be filtered, the filter medium comprising at least two filter layers of the same or different filter media and the filter layers being welded to one another at defined points and/or areas over the complete surface, and at least one filter medium being arranged on the onflow side and at least one filter medium being arranged on the outflow side. Further subject-matters of the invention are a method of producing the composite filter medium, use of the composite filter medium and a filter containing the composite filter medium according to the invention.

18 Claims, 1 Drawing Sheet

MULTILAYER COMPOSITE FILTER MEDIUM FOR SERIAL FILTRATION

FIELD OF THE INVENTION

The subject-matter of the invention is a multilayer composite filter medium for serial filtration with an onflow side and an outflow side with respect to a medium to be filtered. Composite filter media may be used as filter media in engine oil filters, transmission oil filters, fuel filters or air filters, with use in transmission oil filters being preferred.

BACKGROUND OF THE INVENTION

In the prior art, filters which comprise unitary filter mats are predominantly used today for the filtration of transmission oil and engine oil. These are usually nonwoven mats, which may contain glass, cellulose or synthetic fibres and also metal fibres. With these filter media, contaminants of a size from >60 μm can be effectively removed from the liquid to be filtered. However, smaller particles usually cannot be adequately filtered with this material.

With the development of new generations of engines and transmissions, in particular continuously variable transmissions (CVTs), it has become necessary to provide filter materials and filters which ensure a higher purity of the transmission oil. This is associated with the fact that, in CVTs for example, the hydraulic control takes place electronically or else pressure-dependently, and consequently the smallest contaminants are enough to interfere with the transmission control. The classes of oil purity necessary for the operation of transmissions of this type can only be achieved at present by including an additional pressure oil filter. Applications for increasing the purity of engine oil are also possible.

In future, it is intended to be possible for the entire spectrum of dirt particles to be filtered in a filter by suction oil filtration, and for the necessary oil purity class to be achieved by the step alone. To ensure this, it is therefore urgently required to provide filter materials which are more efficient with respect to their retention of contaminants and can also retain contaminants of smaller size. For this purpose, the properties of the filter media must be improved, in particular with regard to pressure loss during filtration, filtration efficiency and dirt take-up capacity.

To solve the problems concerned, it is already known from the prior art to use multilayer filter materials. The aim with theses multilayer filter materials is what is known as serial filtration, in which the coarse particles are initially separated out by means of one or more filter media and the fine particles are subsequently separated out by means of one or more other filter media. Composite filters of this type are currently already being used in transmissions, in particular on the American market. These are composite filter media which comprises a nonwoven filter mat and a woven filter fabric material, which are thermally bonded by means of an adhesive. Open-woven polyester adhesives, which are laid in the form of coarse-meshed gauzes with irregularly distributed meshes between the nonwoven filter mat and the woven filter fabric, are often used as the adhesive. Adhesive in granular form, which are sprinkled onto the materials, are also used. After that, the filter layers are adhesively bonded by heating.

However, these composite fibers have the disadvantage that, on account of the adhesive used and the full surface-area bonding, there is a considerable reduction in the filtration capability of the filter medium, since the adhesive closes the open pores of the woven filter fabric to the greatest extent and consequently greatly reduces the effective filtration surface area. Furthermore, the adhesive gauzes used have an entirely random gauze structure, which leads to irregular adhesive bonding. Consequently, some points in the filter medium have a better filtration capability than other points, at which for example higher adhesive concentrations are present. This results in composite filters with very different properties with regard to pressure loss, filtration efficiency and dirt take-up capacity, so that filter production with standardized properties is not possible. Rather, considerable quality fluctuations occur during production and the production of filters of this type is extremely expensive.

A further disadvantage is the durability of the adhesive bond. Filter media are exposed to considerable temperature fluctuations, which in an extreme case can lie between −30 and +160° C. The strength of the adhesive bond is clearly put under strain at high temperatures and at low temperatures. For example, the strength of the adhesive bond is considerably reduced in particular at high temperatures, so that a partial detachment of the filter layers from one another often occurs at these temperatures.

This has also had the effect that composite filters have not become established in this area in the past, with unitary filter mats being used instead as filter media in the majority of cases.

Furthermore, it is attempted in the prior art to achieve improvements in the filtration by pleating the filter medium. Filter sheet material folded in zigzag form is very often used here, in particular to increase the surface area of the filter media while keeping the spatial volume as small as possible. Filters of this type, in particular for engine oil and transmission oil, are described for example in DE 19735993 A1, WO 01/45823 A1 and DE 4227744 A1. In these cases, zig-zag-shaped filter media are used both in the oil filter area and in the air filter area.

SUMMARY OF THE INVENTION

The technical object of the invention is therefore to provide a multilayer composite filter medium which ensures an adequate filtration of fine and coarse contaminants, has longest possible service times and can be produced by simple processes as a standardized filter medium with a defined filter surface area. Furthermore, optimized properties with respect to pressure loss, filtration efficiency and dirt take-up capacity are to be achieved in particular, to permit troublefree use in CVTs without additional pressure filtration.

The technical object of the invention is achieved by a multilayer composite filter medium for serial filtration, with an onflow side and an outflow side with respect to a medium to be filtered, the filer medium comprising at least two filter layers of the same or different filter media and the filter layers being welded to another at defined points and/or areas over the complete surface, and at least one filter medium being arranged on the onflow side and at least one filter medium being arranged on the outflow side.

An arrangement of this type achieves a serial filtration, in which firstly, within a pre-filtration, coarse particles are separated out in the nonwoven filter mat and subsequently the main filtration takes place in the woven filter fabric, and in this way dirt particles of a diameter greater than 10 μm can be removed.

BRIEF DESCRIPTION OF THE DRAWINGS

The following FIGURE is intended to explain the invention in more detail.

DETAILED DESCRIPTION OF THE INVENTION

Figure 1:
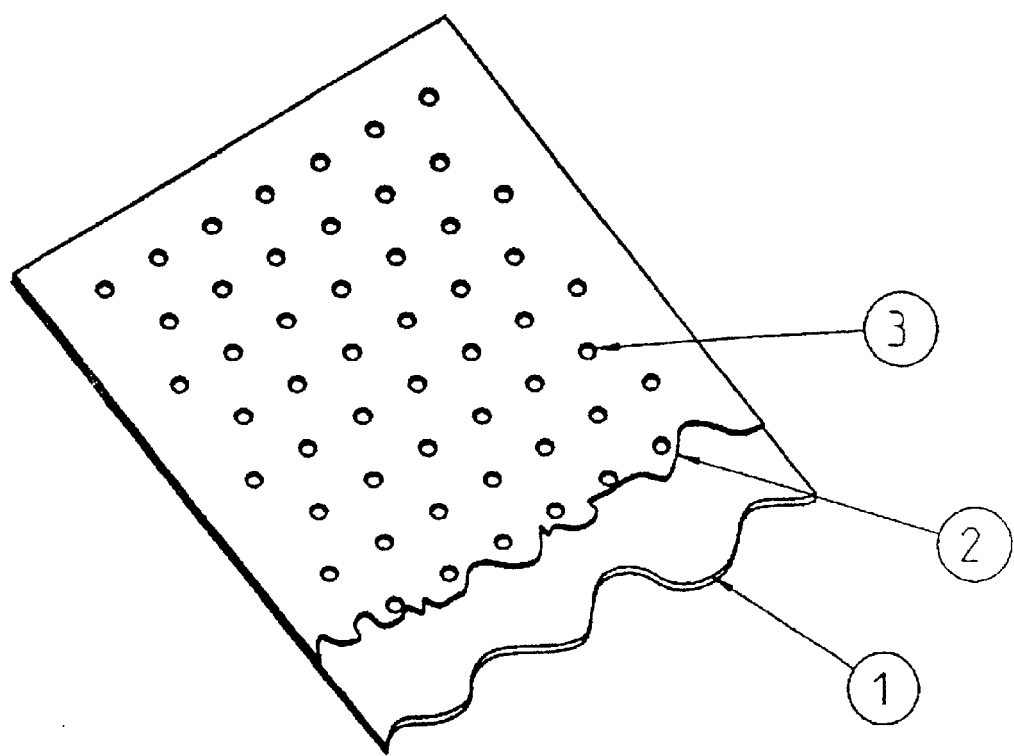
FIG. 1 shows a multilayer composite filter medium according to the invention. The numeral 1 is the nonwoven filter mat, the numeral 3 designates the woven filter fabric and number 2 indicates the ultrasonically welded contours, which are distributed here in the form of a grid on the surface of the filter medium.

In a preferred embodiment, the composite filter medium comprises at least one filter layer of woven filter fabric and at least one filter layer of nonwoven filter mat.

Furthermore, both the nonwoven filter mat and the woven filter fabric can be chosen with respect to their properties in a way corresponding to the requirements of the respective transmission, so that the necessary purity class for the medium to be filtered is ensured.

In one particular embodiment, the multilayer composite filter medium has two filter layers, one filter layer comprising woven filter fabric and one filter layer comprising nonwoven filter mat.

Filter mat materials are nonwoven composite textile materials in which the textile fibres are produced by entanglement, cohesive or adhesive bonds. Filter mat usually consists of polypropylene, polyester, polyhexamethylene adipinamides or viscose, the cohesion of which is generally provided by the bonding intrinsic to the fibres. These nonwoven filter mats may also be mechanically bonded, for example by needling, intermeshing or else by intermingling. Polyester nonwovens, which are preferably obtained as a condensation product of dimethyl terephthalate and ethylene glycol, are particularly preferred. Furthermore, these nonwoven filter mats are mechanically bonded by needling and, in a preferred embodiment, have a coating of phenolic resin, which is resistant in particular to transmission oil or engine oil.

Referred to as woven filter fabric in the sense of the invention are products with crossed filaments of materials such as wool, cotton, synthetic fibres, carbon, metal, glass, asbestos fibres or else polymer fibres. These woven filter fabrics have defined pore sizes, which determine the permeability of the woven filter fabric. In a preferred embodiment, a thermoplastic woven material, which may consist for example of polyethylene, polypropylene, polyhexamethylene adipinamide, polyester and copolymers of these, is used as a filter fabric.

In a preferred way, the particle retention of the nonwoven filter mats used is >60 $\mu$m, preferably >100 $\mu$m. The particle permeability of the thermoplastic woven filter fabrics used lies in the range of 10 to 60 $\mu$m, preferably 25 to 45 $\mu$m, particularly preferably 35 to 45 $\mu$m.

To simplify the welding of the woven filter fabric and nonwoven filter mat, it is preferred to use for the nonwoven filter mat and woven filter fabric a thermoplastic which has a melting and softening point which is as similar as possible. In a particularly preferred way, the nonwoven filter mat and woven filter fabric consist of the same thermoplastic material.

By means of welding the filter media, for example nonwoven filter mat and woven filter fabric, a defined bond is achieved at quite specific points and/or areas of the filter surface. In a preferred way, these welded regions make up 0.5 to 15% of the surface of the composite filter medium. These may be distributed in the form of a grid or in any desired arrangement on the surface of the filter medium. In a particularly preferred embodiment, the welding points make up 1 to 10% and most particularly 2 to 8% of the surface of the composite filter medium.

The multilayer composite filter media according to the invention are produced as follows:

The filter layers arranged one on top of the other are introduced into a gap between an upper mould and a lower mould, the filter layers are moved between the upper mould and lower mould and welded to one another at defined points and/or areas by activation of energy. After the welding, the bonded filter layers are removed from the mould.

The welding may preferably take place by thermal heating, also by ultrasonic welding. Ultrasonic welding is particularly preferred.

In the case of ultrasonic welding, the filter layers arranged one on top of the other are arranged between the sonotrode and anvil of an ultrasonic welding device. The filter layers are subsequently welded to one another at defined points and/or areas with ultrasonic energy by activation of the sonotrode. Subsequently, the bonded filter layers are removed from the device. In a preferred embodiment, the woven filter fabric side lies on the side facing the sonotrode during the ultrasonic welding.

This production procedure ensures a solid and permanent bond between the filter media, without additional adhesive materials having to be used. In this case, the welding contours are determined by the shape and arrangement of the welding regions. They are reproducible and consequently allow the production of a standardized composite filter. Furthermore, an undefinable adhesive clogging of the pores of the woven filter fabric, as occurs for example in the prior art due to the adhesives used, is avoided and it is ensured that the filtration function can be performed in an unhindered way, irrespective of the welding regions.

Multilayer composite filter materials of this type are used in a preferred way as filter media in oil filters, air filters or fuel filters of motor vehicles and most particularly preferably in transmission oil filters of motor vehicles.

A further subject-matter of the invention is a filter, containing the multilayer composite filter medium according to the invention. The filter medium preferably has in the filter a flat, pocket-shaped or pleated form.

With the multilayer composite filter medium according to the invention it is possible to achieve a greater efficiency in the suction and pressure oil ranges, in particular for transmission and engine applications. This involves a serial filtration, with coarser dirt particles being retained in the nonwoven filter mat and finer dirt particles being retained in the downstream woven filter fabric in a preferred embodiment. By this structure of the filter medium, the advantages of surface filtration and depth filtration are combined. With the composite filter medium according to the invention, which is preferably bonded by means of ultrasonic welding, the filer medium is given a particular welding contour, which ensures the optimum open surface area, and consequently throughflow area, and on the other hand ensures permanent bonding of the filtration layers. Furthermore, standardized production of such a filter medium is ensured and production with low tolerances is made possible. The filter media produced in this way also have improved properties with respect to pressure loss, filtration efficiency and dirt take-up capacity and can be used in particular for transmission oil filtration in CVTs, without an additional pressure oil filtration being necessary as in the past. Rather, satisfactory functioning of the transmission and maintenance of the oil purity classes necessary for this are ensured.

EXAMPLES

The following examples are intended to explain in more detail the advantages of the multilayer composite filter medium according to the invention.

Materials Used

A chemically bonded nonwoven polyester filter mat with a downstream 40 µm woven filter fabric was used for the tests. Both materials consist of polyester. The materials were subsequently ultrasonically welded at a frequency of 20 kHz, an amplitude of 100%, a rate of 5 m/s and a distance between the sonotrode and roller of 1.7 mm. The welding points were applied in the form of a grid, so that the welding points make up 2.5% of the surface of the filter material. The properties of the composite filter medium produced in this way were subsequently compared with the composite filter medium produced in a conventional way by means of a coarse-meshed adhesive gauze.

Flow Test of the Filter Media

The pressure drop of a filter at a chosen throughflow rate and temperature was determined for the composite filter media according to the invention and laminated composite filter media by means of a flow test. The same test filters were measured in the same test oil and the same throughflow rate and temperature, once with laminated medium and once with ultrasonically welded medium.

TABLE 1

| No. | Type of bonding | Throughflow | Temperature | Pressure |
|---|---|---|---|---|
| 1 | laminated | 20 l/m | 24° C. | 244.6 mbar |
| 2 | laminated | 10 l/m | −4° C. | 599.6 mbar |
| 3 | welded | 20 l/m | 24° C. | 153.3 mbar |
| 4 | welded | 10 l/m | −4° C. | 427.9 mbar |

In the comparison of numbers 1 and 3, a reduction of the pressure drop by 37% at a temperature of 24° C. is obtained. In the test at lower temperatures, a reduction of the pressure drop by 29% is obtained in comparison of No. 2 with No. 4.

These results show that the ultrasonically welded composite filter medium has a reduction in the pressure drop by about 30% in comparison with the medium laminated with adhesive.

The flow test was carried out in accordance with ISO 3968, adapted for suction oil filters, with the pressure drop being represented by the throughflow.

What is claimed:

1. Multilayer composite filter medium for serial filtration of an oil, the filter medium having an onflow side and an outflow side with respect to a flow of the oil to be filtered, the filter medium comprising at least two filter layers, a first filter layer of the at least two filter layers having a particle retention size of 60 µm and greater, a second filter layer of the at least two filter layers having a particle retention size of 10 to 60 µm, wherein the at least two filter layers are essentially the same material and each layer of the at least two filter layers has a different respective filtering property and the at least two filter layers being welded to one another at defined regions, and at least one filter layer of the at least two filter layers being arranged on the onflow side and at least one filter layer of the at least two filter layers being arranged on the outflow side.

2. Multilayer composite filter medium according to claim 1, wherein at least one filter layer comprises a woven filter fabric and at least one filter layer comprises a nonwoven mat.

3. Multilayer composite filter medium according to claim 1, wherein thermoplastic filter media are used.

4. Multilayer composite filter medium according to claim 2, wherein the particle retention of nonwoven filter mat is >100 µm.

5. Multilayer composite filter medium according to claim 2, wherein the particle retention of the woven filter fabric is 25 to 45 µm.

6. Multilayer composite filter medium according to claim 2, wherein the nonwoven filter mat and woven filter fabric comprise the same thermoplastic material.

7. Multilayer composite filter medium according to claim 1, wherein the regions make up 0.5 to 15% of a surface of the composite filter medium.

8. Multilayer composite filter medium according to claim 1, wherein the regions are arranged in the form of a grid on a surface of the filter medium.

9. Multilayer composite filter medium according to claim 1, wherein the filter medium is located in engine oil filters or transmission oil filters.

10. Multilayer composite filter medium according to claim 1, wherein the multilayer filter medium is located in a filter.

11. Multilayer composite filter medium according to claim 1, wherein the filter medium has a flat or pocket-shaped or pleated form.

12. A multilayer composite filter for serial filtration of a transmission fluid, the multilayer composite filter having an onflow side and an outflow side with respect to the fluid to be filtered, the composite filter comprising:

a first filter layer comprising a nonwoven mat, the first filter layer having a first edge, a first surface, and a second surface, wherein the first filter layer having a particle retention size of 60 µm and greater;

a second filter layer comprising a woven filter fabric, the second filter layer having a particle retention size of 10 to 60 µm, a second edge, a third surface, and a fourth surface, the second surface being disposed against the third surface to form an interface, the interface being welded at a plurality of regions, wherein the first filter layer is arranged on the onflow side to filter coarser dirt particles relative to the second filter layer and the second filter layer being arranged on the outflow side to filter finer dirt particles relative to the first filter layer, and the first filter layer and the second filter layer are essentially the same media.

13. The composite filter according to claim 12, wherein the first filter layer and the second filter layer are comprised of a thermoplastic media.

14. The composite filter according to claim 13, wherein the first thermoplastic media and the second thermoplastic media have a similar melting point.

15. The composite filter according to claim 12, wherein the particle retention size of the first filter layer is >100 µm.

16. The composite filter according to claim 12, wherein the particle retention size of the second filter layer is 25 to 45 µm.

17. The composite filter according to claim 12, wherein the regions make up 0.5 to 15% of the interface.

18. The composite filter according to claim 12, wherein the regions are arranged to form a grid within the interface.

* * * * *